3,666,643
PRODUCTION OF BENZODIAZEPINE DERIVATIVES

Shigeho Inaba, Takarazuka, Tadashi Okamoto and Toshiyuki Hirohashi, Ashiya, Kikuo Ishizumi, Ikeda, Michihiro Yamamoto, Toyonaka, Isamu Maruyama, Minoo, Kazuo Mori, Kobe, Tsuyoshi Kobayashi, Minoo, and Hisao Yamamoto, Nishinomiya, Japan, assignors to Sumitomo Chemical Company, Limited, Osaka, Japan
No Drawing. Filed Mar. 15, 1971, Ser. No. 124,493
Claims priority, application Japan, Mar. 19, 1970, 45/23,732
Int. Cl. C07d 53/06
U.S. Cl. 204—158          4 Claims

ABSTRACT OF THE DISCLOSURE

Benzodiazepine derivatives represented by the formula

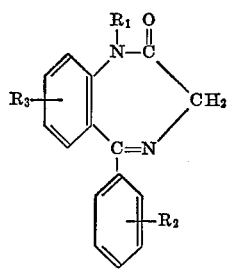

(I)

wherein $R_1$ is hydrogen, a lower alkyl or cycloalkylmethyl group; each of $R_2$ and $R_3$ is hydrogen or halogen atom, are prepared by irradiating a tetrahydrobenzodiazepine derivative represented by the formula,

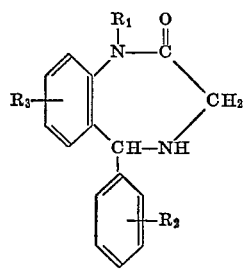

(II)

wherein $R_1$, $R_2$ and $R_3$ are the same as defined above, with ultraviolet light or exposing the said tetrahydrobenzodiazepine derivative to sunlight.

The benzodiazepine derivatives have excellent analgetic, hypnotic, anti-convulsive and muscle relaxing activities.

---

The present invention relates to a process for producing benzodiazepine derivatives. More particularly, the present invention pertains to a preparation of benzodiazepine derivatives represented by the formula,

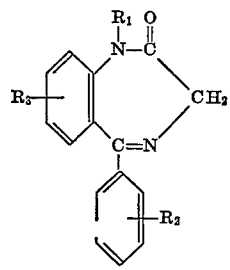

(I)

wherein $R_1$ is a hydrogen atom, a lower $C_{1-4}$-alkyl group or a cyclo-$C_{3-7}$-alkyl-methyl group, each of $R_2$ and $R_3$ is hydrogen atom or halogen atom.

The benzodiazepine derivatives represented by the Formula I are prepared by irradiating a tetrahydrobenzodiazepine derivative represented by the formula,

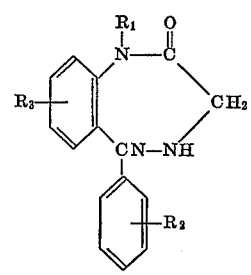

(II)

wherein $R_1$, $R_2$ and $R_3$ are the same as defined above, with light.

The benzodiazepine derivatives represented by the Formula I have excellent analgesic, hypnotic, anti-consulsive and muscle relaxing activities. Furthermore, the benzodiazepine derivatives reprsented by the Formula I are useful as intermediates for producing other benzodiazepine derivatives, which are effective as sedatives, hypnotics, anti-convulsants or muscle-relaxants.

The present invention provides advantageous process for producing such valuable benzodiazepine derivatives.

Tetrahydrobenzodiazepine derivatives represented by the Formula II which may be used as a starting material in the process of the present invention can easily be prepared, for example, by the following process:

An aminobenzhydrylamine derivative represented by the formula,

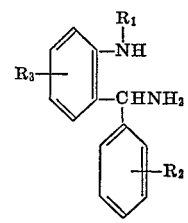

(III)

wherein $R_1$, $R_2$ and $R_3$ are the same as defined above, is reacted with halogenoacetic acid ester to form (2-aminobenzhydryl) amino acetic acid ester derivative. Then the said (2-amino-benzhydryl) amino acetic acid ester derivative is hydrolyzed to the corresponding carboxylic acid derivative, which is cyclized to yield the tetrahydrobenzodiazepine derivative.

According to the process of the present invention, a tetrahydrobenzodiazepine derivative represented by the Formula II is photochemically converted to the benzodiazepine derivative of the Formula I by irradiation with ultraviolet light or exposure to sunlight. The reaction can generally be carried out in the presence of a solvent such as, for example, an alkanol such as methanol, ethanol or isopropanol; an aromatic hydrocarbon such as benzene, toluene or xylene; other organic solvents such as acetone, chloroform, dioxane, dimethylsulfoxide, dimethylformamide or tetrahydrofuran or mixture thereof. The reaction may generally be carried out at room temperature, however, if desired, the reaction can be carried out at higher or lower temperature.

According to the process of the present invention, there are produced such benzodiazepine derivatives as shown below:

5-phenyl-1,3-dihydro-2H-1,4-benzodiazepin-2-one
5-phenyl-7-chloro-1,3-dihydro-2H-1,4-benzodiazepin-2-one
5-phenyl-8-chloro-1,3-dihydro-2H-1,4-benzodiazepin-2-one
1-methyl-5-phenyl-7-chloro-1,3-dihydro-2H-1,4-benzodiazepin-2-one
1-cyclopropylmethyl-5-phenyl-7-chloro-1,3-dihydro-2H-1,4-benzodiazepin-2-one
1-methyl-5-(o-fluorophenyl)-7-chloro-1,3-dihydro-2H-1,4-benzodiazepin-2-one
1-methyl-5-(o-chlorophenyl)-7-chloro-1,3-dihydro-2H-1,4-benzodiazepin-2-one
1-ethyl-5-phenyl-7-chloro-1,3-dihydro-2H-1,4-benzodiazepin-2-one.

The present invention is further illustrated by the following examples of preferred embodiments thereof, which are presented only for purpose of illustration and are not intended to limit the scope of the invention.

EXAMPLE 1

1.0 gram of 1-methyl-5-phenyl-7-chloro-1,3,4,5-tetrahydro-2H-1,4-benzodiazepine is dissolved in 10 ml. of dimethyl sulfoxide and the solution is irradiated for 20 hours with a low-pressure mercury lamp. The reaction mixture is diluted with 50 ml. of water. The formed precipitates are collected by filtration and dried to yield 0.62 g. of 1-methyl-5-phenyl-7-chloro-1,3-dihydro-2H-1,4-benzodiazepin-2-one. Recrystallization from isopropyl alcohol gives pure crystals, having a melting point of 131°–132° C.

Similarly, the following compounds are prepared.

1-cyclopropylmethyl-5-phenyl-7-chloro-1,3-dihydro-2H-1,4-benzodiazepin-2-one, M.P. 145°–146° C.
1-cyclopropylmethyl-5-(o-fluorophenyl)-7-chloro-1,3-dihydro-2H-1,4-benzodiazepin-2-one hydrochloride, M.P., 195° C. (decomp.).

EXAMPLE 2

The procedure of Example 1 is repeated except that the low-pressure mercury lamp is replaced by sunlight.
0.58 gram of 1-methyl-5-phenyl-7-chloro-1,3-dihydro-2H-1,4-benzodiazepin-2-one is obtained, M.P. 131–132° C.

What is claimed is:
1. A process for producing benzodiazepine derivatives represented by the formula,

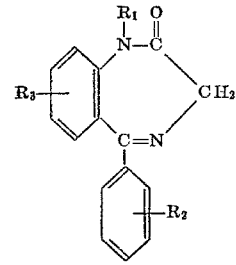

wherein $R_1$ is a hydrogen atom, a lower $C_{1-4}$-alkyl group or a cyclo-$C_{3-7}$-alkyl-methyl group; each of $R_2$ and $R_3$ is hydrogen atom or halogen atom; which comprises irradiating a tetrahydrobenzodiazepine derivative represented by the formula,

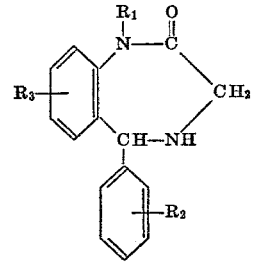

wherein $R_1$, $R_2$ and $R_3$ are the same as defined above, with light.

2. A process according to claim 1, wherein the irradiation is carried out with ultraviolet light or by exposing to sunlight.
3. A process according to claim 1, wherein the reaction is carried out in a solvent.
4. A process according to claim 3, wherein the solvent is selected from the group consisting of methanol, ethanol, isopropanol, benzene, toluene, xylene, acetone, chloroform, dioxane, dimethyl sulfoxide, dimethylformamide, tetrahydrofuran, and mixture thereof.

References Cited
UNITED STATES PATENTS
3,591,581   7/1971   Field et al. _____ 260—239.3 D HENRY R. JILES, Primary Examiner
R. T. BOND, Assistant Examiner U.S. Cl. X.R.
260—239.3 D